United States Patent [19]
Erkens et al.

[11] Patent Number: 5,186,748
[45] Date of Patent: Feb. 16, 1993

[54] PROCESS FOR THE PREPARATION OF BISMUTH VANADATE PIGMENTS, AND NOVEL BISMUTH VANADATE PIGMENTS OF HIGH COLOR STRENGTH

[75] Inventors: Leonardus J. H. Erkens, Maastricht; Gregor Schmitt, Landgraaf; Herman J. J. M Geurts; Werner F. C. G. Corvers, both of Maastricht, all of

[73] Assignee: Ciba-Geigy Corporation, Ardsley, N.Y.

[21] Appl. No.: 845,517

[22] Filed: Feb. 27, 1992

Related U.S. Application Data

[63] Continuation of Ser. No. 728,009, Jul. 5, 1991, abandoned, which is a continuation of Ser. No. 616,555, Nov. 21, 1990, abandoned.

Foreign Application Priority Data

Nov. 30, 1989 [CH] Switzerland ............... 4301/89

[51] Int. Cl.$^5$ .................... C01G 29/00; C01G 31/02
[52] U.S. Cl. .................... 106/479; 106/419; 106/425; 106/427; 106/461; 106/462
[58] Field of Search ............... 106/419, 461, 462, 479, 106/425, 427

[56] References Cited

U.S. PATENT DOCUMENTS

| | | | |
|---|---|---|---|
| 4,026,722 | 5/1977 | Hess | 106/479 |
| 4,063,956 | 12/1977 | Higgins | 106/442 |
| 4,115,141 | 9/1978 | Piltingsrud | 106/479 |
| 4,115,142 | 9/1978 | Hess | 106/461 |
| 4,230,500 | 10/1980 | Balducci et al. | 106/479 |
| 4,251,283 | 2/1981 | Balducci et al. | 106/462 |
| 4,272,296 | 6/1981 | Balducci et al. | 106/461 |
| 4,316,746 | 2/1982 | Rustioni et al. | 106/461 |
| 4,455,174 | 6/1984 | Wienand et al. | 106/479 |
| 4,752,460 | 6/1988 | Herren | 423/593 |
| 4,851,049 | 7/1989 | Wienand et al. | 106/479 |
| 4,937,063 | 6/1990 | Sullivan | 427/593 |

*Primary Examiner*—Mark L. Bell
*Assistant Examiner*—Scott L. Hertzog
*Attorney, Agent, or Firm*—JoAnn Villamizar

[57] ABSTRACT

An improved process for the preparation of bismuth vanadate pigments and solid solutions based on bismuth vanadate by a) mixing a solution of a bismuth (III) salt containing, if required, one or more further metal salts or a mixture thereof with the aqueous solution of a vanadate salt containing, if required, a molybdate, tungstate or sulfate salt or a mixture thereof and b) subjecting the suspension thus obtained to a subsequent aftertreatment to convert the particles first precipitated in amorphous form into crystalline compounds, wherein during the mixing and/or during the subsequent aftertreatment step fluoride ions are used.

15 Claims, No Drawings

PROCESS FOR THE PREPARATION OF BISMUTH VANADATE PIGMENTS, AND NOVEL BISMUTH VANADATE PIGMENTS OF HIGH COLOR STRENGTH

This application is a continuation, of application Ser. No. 728,009, filed Jul. 5, 1991, now abandoned which is a continuation of Ser. No. 616,555 filed Nov. 21, 1990, now abandoned.

The invention relates to an improved process for the preparation of bismuth vanadate pigments and to novel bismuth vanadate pigments of high colour strength and hiding power.

Bismuth vanadates are known compounds; their use as pigments for the coloration of high-molecular-weight organic material is also known. Thus, for example, in U.S. Pat. Nos. 4,115,141 and 4,115,142, bismuth vanadate is described as a pigment-like, bright cowslip-yellow compound for the coloration of plastics and paints. According to these patents, the bismuth vanadate is present entirely in the monoclinic crystal modification (β-fergusonite). This compound is prepared in such a manner that first a gel-like precursor is precipitated from soluble bismuth and vanadium compounds, and then converted into the crystalline, pigment-like form either by a heat treatment at 200°-500° C. or by an aqueous aftertreatment carried out under specific conditions.

Furthermore, in U.S. Pat. No. 4,455,174, bismuth vanadate/molybdate and bismuth vanadate/tungstate derivatives are proposed as yellow pigments. These are multi-phase products consisting of a bismuth vanadate phase and a bismuth molybdate and/or a bismuth tungstate phase.

Moreover, in U.S. Pat. No. 4,316,746, bismuth vanadate/molybdate and bismuth vanadate/tungstate pigments are described, which in the case of bismuth vanadate/molybdates consist of a crystalline phase having a tetragonal scheelite-like structure, while in the case of bismuth vanadate/tungstates two-phase products are present.

Further bismuth vanadate pigments are described in U.S. Pat. No. 4,752,460, solid solutions of bismuth vanadate with certain amounts of molybdate and/or tungstate being disclosed there.

The bismuth vanadates described there can be prepared by two different processes. One process consists in carrying out the synthesis starting from the required metal oxides by a solid-state reaction at elevated temperature (see, for example, U.S. Pat. Nos. 4,063,956 and 4,316,746). In this process, the required metal oxides are mixed together while dry, and the mixture obtained is then subjected to a heat treatment at 300°-700° C. to produce a crystalline pigment-like form. However, it is also possible first to precipitate a gel-like bismuth vanadate derivative—often called a precursor—which is then subjected, after filtration, washing until free of salt and drying, to a subsequent heat treatment, as mentioned above.

The second process disclosed in U.S. Pat. No. 4,752,460 consists in precipitating the bismuth vanadate pigment form an aqueous solution of a bismuth (III) salt, if desired in the presence of further salts, such as alkaline earth metal salts or zinc salts, and an aqueous solution of a vanadate salt, if desired in the presence of further salts, such as molybdate or tungstate salts. The precursor thus prepared is then subjected without calcination to an ageing and crystallization process in aqueous phase. This document further mentions that additives suitable for controlling the crystallization and the particle size of the particles formed, for example chlorides, can be added during the ageing and crystallization step (cf. column 4 lines 10-12 of this document).

It has now been found that the use of certain ions in the precipitation and/crystallization step leads to pigments having improved properties, in particular having a higher colour strength and improved hiding power, while the use of the abovementioned chlorides does not lead to such effects.

The present invention accordingly relates to an improved process for the preparation of bismuth vanadate pigments and solid solutions based on bismuth vanadate by a) mixing a solution of a bismuth (III) salt containing, if required, one or more further metal salts or a mixture thereof with the aqueous solution of a vanadate salt, containing, if required, a molybdate, tungstate or sulfate salt or a mixture thereof and b) subjecting the suspension thus obtained to a subsequent aftertreatment to convert the particles first precipitated in amorphous form into crystalline compounds, wherein during the mixing and/or during the subsequent aftertreatment step fluoride ions are used.

Examples of further metal salts are alkaline earth metal salts and zinc salts.

Examples of bismuth vanadate pigments preparable according to the invention are monoclinic bismuth vanadate pigments of the formula $BiVO_4$ according to U.S. Pat. Nos. 4,115,141 and 4,115,142, bismuth vanadates containing molybdate or tungstate portions according to U.S. Pat. Nos. 4,316,746 and 4,455,174, bismuth vanadate pigments containing certain amounts of $BaSO_4$ according to German Offenlegungsschrift No. 3,004,083, or in particular bismuth vanadate compounds (see U.S. Pat. No. 4,752,460 listed above) of the formula I

$$(Bi,A)(V,D)O_4 \qquad (I),$$

in which A is an alkaline earth metal, Zn or a mixture thereof, and D is Mo, W or a mixture thereof, and the molar ratio of A to Bi is between 0.01 and 0.6 and the molar ratio of D to V is between 0 and 0.4, in which in process step a) a solution of a bismuth (III) salt containing an alkaline earth metal salt or a zinc salt or a mixture thereof is mixed with the aqueous solution of a vanadate salt containing, if required, a molybdate or tungstate salt or a mixture thereof in the abovementioned molar ratios. The compounds of the formula I are solid solutions and can have different crystal modifications depending on the chemical composition.

The symbol (Bi,A) in the above formula I is understood to mean that the bismuth is present as a bismuth (III) ion and is in part replaced by the divalent metal cation A. In contrast, vanadium is present as a pentavalent vanadium ion in the form of a vanadate ion and can in part be replaced by the hexavalent metal cation D in the form of molybdate or tungstate or mixtures thereof. An alkaline earth metal A can be, for example, Be, Mg, Ca, Sr and Ba, but in particular Ca and Sr. D is preferably Mo.

Mixtures suitable according to the invention are mixtures consisting of at least one alkaline earth metal and zinc or mixtures consisting of different alkaline earth metals, and mixtures consisting of molybdenum and tungsten in any desired molar ratio. The preferred molar ratio of A to Bi is 0.02 to 0.5 and that of D of V is 0.01 to 0.3.

According to the invention, those compounds of the formula I are preferably prepared in which A is Ca or Sr and D is Mo or W, and the molar ratio of A to Bi is between 0.03 and 0.4 and that of d to V between 0.01 and 0.3.

Particular preference is given to the preparation of compounds of the formula I in which A is Ca and D is Mo, and the molar ratio of Ca to Bi is between 0.03 and 0.4 and that of Mo to V between 0.01 and 0.3.

As already mentioned above, the process according to the invention comprises two steps: a precipitation step and an aftertreatment step. For precipitation, the required starting materials are mixed as solutions in the form of their ions. The precipitated particles (often named precursors) do not yet have any pigment character, are amorphous according to X-ray diffraction and often gel-like. During the aftertreatment step, stirring of the suspension precipitated is continued, converting the particles into a crystalline form and giving rise to particle growth. It is advantageous not to isolate the particles obtained after the precipitation step (for example by filtration and washing) but to use them directly for the next process step.

The precipitation is carried out by mixing the solution of a bismuth (III) salt, for example in nitric or acetic acid, containing, if required, one or more further metal salts, for example an alkaline earth metal salt or zinc salt or a mixture thereof, with the aqueous solution of a vanadate salt containing, if required, a molybdate, tungstate or sulfate salt or a mixture thereof.

The upper concentration limits of the reaction solutions listed above are determined by the solubility of the salts used, although the use of dilute solutions, in particular for better control of the equimolar mixing in portions of the solutions suitable according to the invention is advantageous. The solutions are advantageously mixed at 10°–100° C., preferably at 20°–40° C.

Bismuth (III) salt solutions can be prepared, for example, by dissolving bismuth nitrate [for example $Bi(NO_3)_3 5H_2O$] in, for example, 1.0 to 4.0 n nitric acid or in acetic acid. Aqueous vanadate solutions can be prepared, for example, from alkali metal vanadate salts [for example sodium vanadate or potassium vanadate salts, for example $NaVO_3$ (meta vanadate) or $Na_3VO_4$ (ortho vanadate)], ammonium vanadate or by dissolving pentavalent vanadium oxide in basic solution. As molybdate, tungstate or sulfate salts, for example, the corresponding sodium salts, potassium salts or ammonium salts are used or the corresponding oxides are dissolved in basic solution.

Examples of suitable alkaline earth metal salts or zinc salts are the corresponding chlorides, acetate or nitrates, or the corresponding oxides are dissolved in acid solution. The precipitation reactions of the precursors can be carried out batchwise or continuously. The solutions are preferably mixed with thorough stirring, if appropriate with high turbulence, for example in a flow reactor, in a mixing nozzle, if appropriate under elevated pressure, or in an apparatus equipped with a high-performance stirrer. The mixing of the various reaction solutions can be carried out either continuously by simultaneous addition or batchwise by initially introducing one solution and metering in the other solution(s).

The normalities of the abovementioned acid and basic solutions are adjusted, for example before mixing, such that the pH of the resulting mixture is between −1 and 6, but preferably below 3.

The compounds of the formula I can also be obtained by preparing the precursor by mixing the aqueous solution of an alkaline earth metal salt or zinc salt or a mixture thereof with a solution of a molybdate or tungstate salt or a mixture thereof to form a compound of the formula $ADO_4$, and this compound can then, after ageing, if appropriate at elevated temperature, simultaneously or successively be mixed with the aqueous solution of a bismuth (III) salt and the aqueous solution of a vanadate salt to form a compound according to the invention. The pH of the various starting solutions should preferably be adjusted such that it is in the acidic region during the addition of these solutions, but preferably not above 3.

According to a variation of the precipitation step, the solution of a bismuth (III) salt and, if required, a further metal salt, for example an alkaline earth metal salt or zinc salt or a mixture thereof, and the aqueous solution of a vanadate salt and, if required, a molybdate, tungstate or sulfate salt or a mixture thereof can be simultaneously added to water.

After the precipitation step, the precursors thus prepared are subjected to a crystallization and ageing process (=aftertreatment step) in aqueous phase.

This is done by adjusting the suspension obtained after the precipitation step to a pH in the acidic region, for example to a pH between 4 and 8.5, preferably between 5 and 7, by adding an inorganic base and continuing stirring. In this step, heating of the suspension, which, if desired, may be stepwise, for example to 50° to 110° C., advantageously to 90°–95° C., during or after the increase in pH proves advantageous. The increase in pH can also be carried out stepwise by, for example, stirring the suspension first for some time, for example 60 minutes, at, for example, a pH of 3.5, and only then further increasing the pH. The heating can take place, for example, by electric external heating of the reaction boiler or, alternatively, also by direct addition of steam into the reaction boiler.

Examples of suitable inorganic bases are NaOH or KOH, preferably in the form of an aqueous solution.

During the aftertreatment, the gel-like amorphous precursor is converted into a crystalline, brilliant-yellow compound whose crystallinity can be characterized as good according to the powder X-ray diffraction diagram. Depending on the scale of the batch, the overall time for the aftertreatment step can vary. In general, 2 to 5 hours are sufficient for achieving complete crystallization.

It is in principle possible to employ the fluoride ions, for example, as a separate aqueous solution or, alternatively, to mix them with the bismuth (III) solution or with the vanadate solution and then to combine both solutions. Preferably, however, the fluoride ions are present in the vanadate solution. A further possibility is that both the bismuth (III) solution and the vanadate solution contain fluoride ions.

According to the process of the invention, it is also possible to admix the fluoride ions not until the aftertreatment step is carried out. However, it is also possible to divide the addition of the fluoride ions over both process steps.

According to the invention, the fluoride ions are preferably added during the aftertreatment.

The amount of fluoride ions can vary; advantageously, between 0.1 and 3 mol of a fluoride salt, relative to 1 mol of bismuth, are used, but preferably between 0.8 and 1.2 and very particularly preferably 1 mol of fluoride salt. Examples of suitable fluoride salts are alkali metal fluorides, alkaline earth metal fluorides and ammonium fluorides, for example NaF, KF, NH$_4$F, but in particular NaF and KF, advantageously as an aqueous solution.

The workup of the compounds obtained according to the invention is carried out in the usual manner, for example by filtering off the product, washing the filter cake with water to remove soluble salts, drying and pulverizing.

To improve the pigment properties, for example their stability to heat, light and chemical attack, it is advantageous to coat the compounds obtained according to the invention during their preparation (precipitation/aftertreatment) or preferably following the process steps described above by a treatment in accordance with known processes described, for example, in U.S. Pat. Nos. 3,370,971, 3,639,133 and U.S. Pat. No. 4,046,588 with an inorganic or organic protective cover. For this purpose, for example, inorganic substances, for example, aluminium compounds, titanium compounds, antimony compounds, cerium compounds, zirconium compounds or silicon compounds, or zinc phosphate or mixtures thereof, are deposited on the bismuth vanadate pigments. This treatment can be carried out in one or more steps. The amount of coating agent is advantageously 2-40, preferably 2-20 and in particular 3-10%, relative to the total weight of the compound.

To improve specific pigment properties, the products obtained according to the invention can additionally be treated with texture-improving agents, for example with long-chain aliphatic alcohols, esters, acids or salts thereof, amines, amides, waxes or resin-like substances, such as abietic acid, hydrogenation products thereof, esters or salts, furthermore with nonionic, anionic or cationic surface-active agents.

The products obtained according to the invention can, if desired, be converted into dust-free pigment preparations by customary methods, for example as described in U.S. Pat. No. 4,762,523.

The invention furthermore relates to novel bismuth vanadate pigments of the above formula I having a very high colour strength, in which in formula I A is an alkaline earth metal, Zn or a mixture thereof and D is Mo, W or a mixture thereof and the molar ratio of A to Bi is between 0.01 and 0.6 and the molar ratio of D to V is between 0 and 0.4, wherein these compounds have a colour strength of 0.045 to 0.130 at a standard depth of shade of 1/25 according to DIN 53235.

The definition of the substituent A and the molar ratios of A to Bi and D to V is the same as already given above.

The preferred molar ratio of A to Bi is 0.02 to 0.5 and that of D to B 0.01 to 0.3.

Preference is given to bismuth vanadate pigments of the formula I in which A is Ca and D is Mo and the molar ratio of Ca to Bi is between 0.03 and 0.4 and that of Mo to V between 0.01 and 0.3.

The hue of the bismuth vanadate pigments of the formula I having a high colour strength and obtained by the process according to the invention can be influenced, for example, on the one hand, by varying the molar ratio of Ca to Bi and/or Mo to V, and, on the other hand, also by varying the pH before or during the heating in the aftertreatment step so that pigments having greenish yellow and reddish yellow hues can be obtained in application.

The bismuth vanadate pigments of the formula I have in most cases a tetragonal scheelite-like crystal structure.

The tetragonal crystal structure was characterized by recording the powder X-ray diffraction diagram. Even though it is of course necessary to view the entire diagram for evaluation, the region at an interplanar spacing of about 2.6 Å is particularly illustrative. BiVO$_4$ in the stable beta-fergusonite structure, which has monoclinic symmetry, produces two lines a d values of 2.546 Å and 2.598 Å of approximately equal intensity. The tetragonal scheelite-like structure exhibits only one line at a da value of about 2.58 Å in this region.

The colour strength is expressed by the ratio of a colour pigment to the white pigment (TiO$_2$) applied in a paint which leads to a standard depth of shade of 1/25 according to DIN 53235. This means that this ratio indicates the amount of colour pigment (which, in this case, is a compound of the formula I according to the invention) which, when mixed with a given amount of white pigment, makes it possible to produce a coloration at a standard depth of shade of 1/25 when the paint is applied.

The above bismuth vanadate pigments of high colour strength can be prepared by the process already mentioned above.

The bismuth vanadate pigments obtained according to the invention have good pigment properties and are highly suitable for pigmenting a high-molecular-weight organic materials.

The high-molecular-weight organic material to be coloured according to the invention can be of natural or synthetic origin. The materials can be, for example, natural resins or drying oils, rubber or casein or modified natural substances, such as chlorinated rubber, oil-modified alkyd resins, viscose, cellulose ethers or esters, such as cellulose acetate, cellulose propionate, cellulose acetobutyrate or nitrocellulose, but in particular fully synthetic organic polymers (thermosets and thermoplastics) such as are obtained by polymerization, polycondensation or polyaddition. Examples from the class of polymers are primarily: polyolefins, such as polyethylene, polypropylene or polyisobutylene, furthermore substituted polyolefins, such as polymers made of vinyl chloride, vinyl acetate, styrene, acrylonitrile, acrylic and/or methacrylic esters or butadiene, and copolymers of the monomers mentioned, in particular ABS or EVA. Examples from the series of polyaddition and polycondensation resins are the condensation products of formaldehyde with phenols, the so-called phenolic resins, and the condensation products of formaldehyde with urea, thiourea and melamine, the so-called amino resins, further the polyesters used as coating resins, not only saturated ones, for example alkyd resins, but also unsaturated ones, for example maleate resins, further linear polyesters, polyamides, polycarbonates and polyphenylene oxides or silicones. The high-molecular-weight compounds mentioned can be present individually or in mixtures, as plastic compositions or melts which, if desired, can be spun to form fibres. They can also be present in dissolved form as film formers or binders for paints, coating agents or printing inks, for example linseed-oil varnish, nitrocellulose, alkyd resings, melamine resins and urea-formaldehyde resins or acrylic resins.

The pigmenting of the high-molecular-weight organic substances by means of the compounds obtained according to the invention is carried out, for example, by admixing such a compound, if appropriate in the form of master batches, to these substrates with the use of roll mills, mixing or milling apparatuses. The pigmented material is then converted into the desired final shape by processes known per se, such as calendering, pressing, extruding, brushing, pouring or injection-moulding. It is often desirable to incorporate so-called plasticizers in the high-molecular-weight compounds before moulding for producing non-rigid mouldings or for reducing their brittleness. Examples of suitable plasticizers are esters of phosphoric acid, of phthalic acid or sebacic acid. The plasticizers can be incorporated in the polymers before of after the incorporation of the compounds obtained according to the invention. Furthermore, it is possible to add, in addition to the compounds obtained according to the invention, fillers or other colour-imparting components, such as white, colour or black pigments, in any desired amounts to the high-molecular-weight organic materials for the purpose of obtaining different hues.

For the pigmenting of paints, coating agents and printing inks, the high-molecular-weight organic materials and the bismuth vanadate pigments, if appropriate together with additives, such as fillers, other pigments, siccatives or plasticizers, are finely dispersed or dissolved in a joint organic solvent or solvent mixture. This can be done by dispersing or dissolving the individual components by themselves or also several at the same time and only then combining all components.

The bismuth vanadate pigments preparable according to the invention can be present in the suitable high-molecular-weight organic material, for example, in an amount of 0.001 to 70% by weight, relative to the material, but in particular of 0.01 to 35% bu weight.

Preferred application fields are in the industrial and automotive coating sector for producing lead-free weather-resistant brilliant single-colour shades, and in mixtures with other pigments for producing specific shades.

When incorporated in plastics, fibres, paints, coating agents or prints, the compounds obtained according to the invention are distinguished by good general pigment properties, such as good dispersibility, high colour strength, purity of shade, high hiding power, good overcoating, migration, heat, light and weather fastness, and good resistance to chemicals, such as acids, bases, organic solvents and industrial atmosphere, and in particular by a very high colour strength and a high hiding power. In addition, they impart good rheological performance to the printing inks, coating agents and paints produced therefrom and good gloss to the dried films.

In the examples which follow, percentages are by weight. The composition of the compounds has been determined by elemental analysis and is stated in the form of molar ratios calculated therefrom of A to Bi and D to V. The bismuth (III) oxide content is calculated from the other contents determined directly.

EXAMPLE 1

$(Bi,Ca)(V,Mo)O_4$ 97.0 g of $Bi(NO_3)_3.5H_2O$, 11.8 g of $Ca(NO_3)_2.4H_2O$ and 72.0 g of 54% $HNO_3$ are dissolved in 600 ml of $H_2O$. A solution of 28.0 g of $NaVO_3.H_2O$, 12.1 g of $Na_2MoO_4.2H_2O$, 4.7 g of NaF and 20.0 g of NaOH in 600 ml of $H_2O$ is added with stirring. The pH of the suspension thus obtained is about 0.9 and is brought to 3.5 with 30% sodium hydroxide solution. The suspension is then stirred at this pH and room temperature for one hour. The pH is then increased to 6.5 over a period of one hour by slow addition of 1N sodium hydroxide solution. The suspension is then heated to reflux, while maintaining the pH of this suspension at 6.5 by further addition of 1N sodium hydroxide solution (for example by means of a pH meter). The pH is kept constant at 6.5 until the suspension begins to turn yellow, at which point a spontaneous increase in pH occurs. Stirring of the pigment suspension is then continued under reflux for one hour, during which the pH increases to about 8.5, the suspension is then filtered off, and the residue is washed until free of salt and dried at 90° C. in a drying cabinet to give 71 g of a bright yellow pigment powder giving the following elemental analysis: Ca:4.9%; V:11.7% and Mo:1.5%. This leads to the following molar ratios: Ca to Bi=0.40; Mo to V: 0.07. The X-ray diffraction diagram shows a tetragonal structure.

EXAMPLE 2

$(Bi,Ca)(V,Mo)O_4$

The procedure of Example 1 is repeated, except that the following amounts of compounds are used: 97.0 g of $Bi(NO_3)_3.5H_2O$, 2.95 g of $Ca(NO_3)_2.4H_2O$ and 72.0 g of 54% $HNO_3$ in 600 ml of $H_2O$; 28.0 g of $NaVO_3.H_2O$, 3.0 g of $Na_2MoO_4.2H_2O$, 7.1 g of NaF and 20.0 g of NaOH in 600 ml of $H_2O$. Before heating, the pH is brought to 5.9 and kept constant during the heating. 69 g of a pigment powder are obtained which gives the following elemental analysis: Ca:3.4%; V:11.8% and Mo:0.5%. This leads to the following molar ratios: Ca to Bi=0.31; Mo to V:0.02.

EXAMPLE 3

$(Bi,Ca)(V,Mo)O_4$: Varying the Molar Ratios of Ca to Bi and Mo to V 97.0 g of $Bi(NO_3)_3.5H_2O$, 7.2 g of $Ca(NO_3)_2.4H_2O$ and 72.0 g of 54% $HNO_3$ are dissolved in 600 ml of $H_2O$; A solution of 28.0 g of $NaVO_3.H_2O$, 7.6 g of $Na_2MoO_4.2H_2O$, 7.1 g of NaF and 20.0 g of NaOH in 600 ml of $H_2O$ is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension obtained is then filtered off, and the residue is washed until free of salt and dried at 90° C. in a drying cabinet to give 71 g of a bright yellow pigment powder giving the following elemental analysis: Ca:4.1%; V:17.3% and Mo:3.5%. This leads to the following molar ratios: Ca to Bi=0.36; Mo to V:0.11.

EXAMPLE 4

(Bi,Mg)(V,Mo)O$_4$; using Mg(NO$_3$)$_2$ instead of Ca(NO$_3$)$_2$ 97.0 g of Bi(NO$_3$)$_3$.5H$_2$O, 3.1 g of Mg(NO$_3$)$_2$.6h$_2$O and 72.0 g of 54% HNO$_3$ are dissolved in 600 ml of H$_2$O. A solution of 28.0 g of NaVO$_3$.H$_2$O, 3.0 g of Na$_2$MoO$_4$.2H$_2$O, 7.1 g of NaF and 20.0 g of NaOH in 600 ml of H$_2$O is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Mg:0.3%; V:16.8% and Mo:1.6%. This leads to the following molar ratios: Mg to Bi=0.04; Mo to V:0.05.

EXAMPLE 5

(Bi,Sr)(V,Mo)O$_4$; using Sr(NO$_3$)$_2$ instead of Ca(NO$_3$)$_2$ 97.0 g of Bi(NO$_3$)$_3$.5H$_2$O, 2.6 g of Sr(NO$_3$)$_2$.6H$_2$O and 72.0 g of 54% HNO$_3$ are dissolved in 600 ml of H$_2$O. A solution of 28.0 g of NaVO$_3$.H$_2$O, 3.0 g of Na$_2$MoO$_4$.2H$_2$O, 7.1 g of NaF and 20.0 g of NaOH in 600 ml of H$_2$O is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Sr:2.2%; V:18.8% and Mo:1.2%. This leads to the following molar ratios: Sr to Bi=0.09; Mo to V:0.03

EXAMPLE 6

(Bi,Zn)(V,Mo)O$_4$; using Zn(NO$_3$)$_2$ instead of Ca(NO$_3$)$_2$ 97.0 g of Bi(NO$_3$)$_3$.5H$_2$O, 3.6 g of Zn(NO$_3$)$_2$.6H$_2$O and 72.0 g of 54% HNO$_3$ are dissolved in 600 ml of H$_2$O. A solution of 28.0 g of NaVO$_3$.H$_2$O, 3.0 g of Na$_2$MoO$_4$.2H$_2$O, 7.1 g of NaF and 20.0 g of NaOH in 600 ml of H$_2$O is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Zn:1.2%; V:18.3% and Mo:1.6%. This leads to the following molar ratios: Zn to Bi=0.06; Mo to V:0.05.

EXAMPLE 7

(Bi,Sr)(V,Mo)O$_4$; using Sr(NO$_3$)$_2$ instead of Ca(NO$_3$)$_2$ 97.0 g of Bi(NO$_3$)$_3$.5H$_2$O, 5.1 g of Sr(NO$_3$)$_2$. and 72.0 g of 54% HNO$_3$ are dissolved in 600 ml of H$_2$O. A solution of 28.0 g of NaVO$_3$.H$_2$O, 12.1 g of Na$_2$MoO$_4$.2-H$_2$O, 7.1 g of NaF and 20.0 g of NaOH in 600 ml of H$_2$O is added with stirring. The pH of the suspension thus obtained is about 0.9 and is brought to 3.5 with 30% sodium hydroxide solution. The suspension is then stirred at this pH and room temperature for one hour. The pH is then increased to 6.5 over a period of one hour by slow addition of 1N sodium hydroxide solution. The suspension is then heated to reflux, while maintaining the pH of this suspension at 6.5 by further addition of 1N sodium hydroxide solution (for example by means of a pH meter). The pH is kept constant at 6.5 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 71 g of a bright yellow pigment powder giving the following elemental analysis: Sr:1.9%; V:18.0% and Mo:5.5%. This leads to the following molar ratios: Sr to Bi=0.08; Mo to V:0.16.

EXAMPLE 8

(Bi,Ca,Sr)(V,MO)O$_4$; using Ca(NO$_3$)$_2$ and Sr(NO$_3$)$_2$ 97.0 g of Bi(NO$_3$)$_3$.5H$_2$O, 5.9 g of Ca(NO$_3$)$_2$.4H$_2$O, 5.3 g of Sr(NO$_3$)$_2$ and 72.0 g of 54% HNO$_3$ are dissolved in 600 ml of H$_2$O. A solution of 28.0 g of NaVO$_3$.H$_2$O, 12.1 g of Na$_2$MoO$_4$.2H$_2$O, 7.1 g of NaF and 20.0 g of NaOH in 600 ml of H$_2$O is added with stirring. The pH of the suspension thus obtained is about 0.9 and is brought to 3.5 with 30% sodium hydroxide solution. The suspension is then stirred at this pH and room temperature for one hour. The pH is then increased to 6.5 over a period of one hour by slow addition of 1N sodium hydroxide solution. The suspension is then heated to reflux, while maintaining the pH of this suspension at 6.5 by further addition of 1N sodium hydroxide solution (for example by means of a pH meter). The pH is kept constant at 6.5 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 71 g of a bright yellow pigment powder giving the following elemental analysis: Sr:2.3%; Ca:2.6%; V:17.2% and Mo:5.0%. This leads to the following molar ratios: Sr to Bi=0.09; Ca to Bi=0.23; Mo to V:0.15.

EXAMPLE 9

Pure Bismuth Vanadate 97. g of $Bi(NO_3)_3.5H_2$O and 72.0 g of 54% $HNO_3$ are dissolved in 600 ml of $H_2O$. A solution of 28.0 g of $NaVO_3.H_2O$, 7.1 g of NaF and 20.0 g of NaOH in 600 ml of $H_2O$ is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet. A somewhat reddish pigment powder having a lower colour strength than a corresponding bismuth vanadate pigment according to the above formula I is obtained.

EXAMPLE 10

(Bi,Ca)(V,Mo)$O_4$; Varying the Amount of Fluoride 97.0 g of $Bi(NO_3)_3.5H_2O$, 2.9 g of $Ca(NO_3)_2.4H_2O$ and 72.0 g of 54% $HNO_3$ are dissolved in 600 ml of $H_2O$. A solution of 28.0 g of $NaVO_3.H_2O$, 3.0 g of $Na_2MoO_4.2H_2O$, 7.1 g of NaF and 20.0 g of NaOH in 600 ml of $H_2O$ is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Ca:2.0%; V:18.6% and Mo:1.3%. This leads to the following molar ratios: Ca to Bi=0.06; Mo to V:0.04.

EXAMPLE 11

(Bi,Ca)(V,Mo)$O_4$; Varying the Amount of Fluoride 97.0 g of $Bi(NO_3)_3.5H_2O$, 2.9 g of $Ca(NO_3)_2.4H_2O$ and 72.0 g of 54% $HNO_3$ are dissolved in 600 ml of $H_2O$. A solution of 28.0 g of $NaVO_3.H_2O$, 3.0 g of $Na_2MoO_4.2H_2O$, 0.8 g of NaF and 20.0 g of NaOH in 600 ml of $H_2O$ is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Ca:2.0%; V:18.6% and Mo:1.3%. This leads to the following molar ratios: Ca to Bi=0.17; Mo to V:0.04.

EXAMPLE 12

(Bi,Ca)(V,Mo)$O_4$; Addition of Fluoride Ions after the Precipitation 97.0 g of $Bi(NO_3)_3.5H_2O$, 2.9 g of $Ca(NO_3)_2.4H_2O$ and 72.0 g of 54% $HNO_3$ are dissolved in 600 ml of $H_2O$. A solution of 28.0 g of $NaVO_3.H_2O$, 3.0 g of $Na_2MoO_4.2H_2O$, 7.1 g of NaF and 20.0 g of NaOH in 600 ml of $H_2O$ is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux, while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Ca:2.0%; V:18.6% and Mo:1.3%. This leads to the following molar ratios: Ca to Bi=0.17; Mo to V:0.04.

EXAMPLE 13

(Bi,Ca)(V,Mo)O$_4$; Addition of Fluoride Ions at a pH of 6.0

97.0 g of Bi(NO$_3$)$_3$.5H$_2$O, 2.9 g of Ca(NO$_3$)$_2$.6H$_2$O and 72.0 g of 54% HNO$_3$ are dissolved in 600 ml of H$_2$O. A solution of 28.0 g of NaVO$_3$.H$_2$O, 3.0 g of Na$_2$MoO$_4$.2H$_2$O, 7.1 g of NaF and 20.0 g of NaOH in 600 ml of H$_2$O is added with stirring. The pH of the suspension thus obtained is about 0.9 and is brought to 3.5 with 30% sodium hydroxide solution. The suspension is then stirred at this pH and room temperature for one hour. The pH is then increased to 6.0 over a period of one hour by slow addition of 1N sodium hydroxide solution. The suspension is then heated to reflux and a solution of 7.1 g of NaF in 100 ml of H$_2$O is added to the pigment suspension while maintaining the pH of this suspension at 6.0 by further addition of 1N sodium hydroxide solution (for example by means of a pH meter). The pH is kept constant at 6.0 until the suspension begins to turn yellow, at which point a spontaneous increase in pH occurs. Stirring of the pigment suspension is then continued under reflux for one hour, during which the pH increases to about 8.5. In order to dissolve vanadate which has not been completely incorporated, the pH is adjusted to 9.8, the suspension is then filtered off, and the residue is washed until free of salt and dried at 90° C. in a drying cabinet to give 69 g of a bright yellow pigment powder giving the following elemental analysis: Ca:2.0%; V:18.6% and Mo:1.3%. This leads to the following molar ratios: Ca: to Bi=0.17; Mo to V:0.04.

EXAMPLE 14

Working Example in HDPE 3 g of the pigment according to the invention from Example 1 and 1000 g of ®Vestolen 6016 (from HUELS) are weighed into a 3 l glass bottle and mixed for 2 hours while dry. The mixture is then extruded twice at 200° C. and then granulated. Finally, 1.5 mm thick discs are produced on an injection-moulding machine, and the heat resistance of the injection-moulding composition is tested by exposing it to a temperature between 220° C. and 300° C. in each case for 5 minutes. The pigment is distinguished by excellent heat resistance.

EXAMPLE 15

Working Example in PVC 0.5 g of the pigment obtained according to Example 1 are mixed together with 76 g of polyvinyl chloride, 33 g of dioctyl phthalate, 2 g of dibutyltin dilaurate and 2 g of titanium dioxide, and the mixture obtained is processed to a thin sheet on a roll mill at 160° C. over a period of 15 minutes. The greenish yellow coloration thus produced has high colour strength, high hiding power, and is migration and light fast.

EXAMPLE 16

Application in an Alkyd-Melamine Stoving Enamel 60 g of a 60% solution of a non-drying alkyd resin in xylene (commercial name ®Beckosol 27-320 from Reichhold-Albert-Chemie), 36 of a 50% solution of a melamine-formaldehyde resin in a butanol-xylene mixture (commercial name ®Super-Beckman 13-501 from Reichhold-Albert-Chemie), 2 g of xylene and 2 g of methylcellosolve are mixed, and 100 g of this mixture is stirred by means of a stirrer to give a homogeneous paint solution.

30 g of the clear paint thus obtained, 10 g of the pigment obtained according to Example 1,9 ml of methyl isobutyl ketone and 135 g of glass beads (4.5 mm in diameter) are dispersed on a Vibratom vibrating mill (from Siebtechnik, Mülheim/Ruhr, Germany) over a period of 16 hours. The paint thus obtained is drawn onto a vinyl-coated aluminium strip by means of the Erichsen film spreader (Type 238/1), the paint film obtained is then flashed off for 1 hour and stoved at 130° C. for 30 minutes. A brilliant, greenish-yellow and lightfast coating is obtained.

PROCEDURE FOR PREPARING THE WHITE REDUCTION PAINT USED FOR DETERMINING THE COLOUR STRENGTH

To determine the colour strength, coloured test panels are prepared in the following manner. To adjust the standard depth of shade to 1/25 according to DIN 53235, x g of colour pigment (bismuth vanadate pigment according to the invention), relative to 10.0 g of titanium dioxide, are added in such an amount that the sum of X+y is 33.0 g.

The following are added in succession to a 180 ml glass container with lid:

100 g of glass beads, 3 mm,
28.0 g of dispersing medium
  x g of colour pigment and
  y g of titanium dioxide (Type RCR-2, from Tioxid).

The dispersing medium comprises:

34.4% of alkyd paint (Nebores ® SP-24-70, soya phthalate of an alkyd resin, 70% by weight in Shellsol ® H (white spirit) dissolved, from Necarbo),
47% of solvent (Shellsol ® H),
0.3% of dispersing agent [Borchigen ® 911 (soya lecithin) from Borchers],
0.8% of antiskinning agent (Exkin ® 2,10% in Shellsol ® H),
1.1% of wetting agent (1% of Baysilon ® MA in Shellsol ® H, from Byk-Malinckrodt),
16.4% of siccatives (mixture of octanoate salts, 6.0% of Zr, 1.2% of Co, 3.0% of Ca).

For dispersion, the glass vessel and contents were shaken on the dispersing apparatus Skandex for 15 minutes. 70 g of Nebores ® SP-24-70 were then added, and the mixture was again dispersed by means of the dispersing apparatus Skandex for 10 minutes. A paint film is applied to a cardboard panel (cardboard from Leneta, USA, form WDX) by means of the film spreader Bird applicator BA-30, and the film is then dried in air for 12 hours (wet film thickness: 80 micron; dry film thickness: 35 micron). This is followed by the colour measurements.

COLOUR MEASUREMENTS

The colour measurements were carried out with the paint films described. To determine the colour strength, the paint films were only measured on white backgrounds. The determination of the colour strength based on DIN 53235 has already been described above.

TECHNICAL DATA OF THE MEASURING INSTRUMENT

| | |
|---|---|
| Spectrophotometer: | Datacolor 3890; |
| Geometry: | d/8°; |
| Measuring aperture: | 27 mm; |
| Wavelength: | 400–700 nm, every 20 nm. |

CALIBRATION

The white standard is prepared from BaSO₄ for colorimetry (Merck). For this purpose, a tablet is pressed, and the measured values are entered as absolute values. The black standard (Zeiss) is a tube closed on one side and lined with velvet (reflection value 0%).

PROCEDURE FOR PREPARING A FULL SHADE VARNISH

Coloured test panels are prepared in the following manner:

70 ml of glass beads (3 mm in diameter), 30.0 g of dispersing medium and 21.0 g of coloured pigment are added in succession to a 180 ml glass vessel with lid.

The dispersing medium comprises:

| |
|---|
| 28.6% of ® Setal 84 XX 70 (from Synthese, NL) and 71.4% of xylene. |

For dispersing, the glass vessel and contents are shaken on the dispersing apparatus Skandex [Internatio-Alchemy] for 15 minutes. 62.0 g of binder are then added, and the mixture is again shaken on the dispersing apparatus Skandex. The binder comprises:

| |
|---|
| 53.4% of ® Setal 88 XX 70 (from Synthese, NL), |
| 25.6% of ® Setamine US 132 BB 70 (from Synthese, NL), |
| 3.1% of wetting agent (1.0% ® Baysilon oil MA from Bayer and 98.0% of Depanol ® J) |
| 6.1% of n-butanol (pure), |
| 8.6% of solvent ( ® Solvesso 100, from Esso) and |
| 3.1% of isophorone (3,5,5-trimethyl-2-cylohexen-1-one). |

PREPARATION OF THE COLOURED TEST PANELS

The full shade varnish and the white reduction paint sprayed onto sheet metal panels.

| Details: | Spraying pressure: | 2.5 bar; |
|---|---|---|
| | Film thickness (dry): | 80 micron; |
| | Flash off time: | 30 minutes (room temperature); |
| | Stoving time: | 30 minutes at 130° C. |

The metal sheets are sprayed again, resulting in an opaque paint film of 160 micron (dry film thickness).

COLORIMETRY

Using the full shade varnishes, it is possible, for example, to measure the standard colour values X, Y and Z. The measurement of the 16 reflection values and the calculation of the standard colour values X, Y and Z are carried out according to DIN 5033 for CIE standard illuminant D 65 and 10° standard colorimetric observer, including gloss. When calculating the values, 4% of diffuse reflection are subtracted.

Technical data of the measuring instrument and calibration: same as mentioned above in the determination of the colour strength.

What is claimed is:

1. An improved process for the preparation of bismuth vanadate pigments and solid solutions based on bismuth vanadate comprising
   a) admixing a solution of a bismuth (III) salt containing one or more further metal salts, with an aqueous solution of a vanadate salt optionally containing a molybdate, tungstate or sulfate salt or a mixture thereof, thereby producing a suspension of particles in amorphous form; and
   b) subjecting said suspension thus obtained to a subsequent aftertreatment to convert the particles first precipitated in amorphous form into crystalline compounds; wherein in step a), step b), both step a) and step b) or after step b fluoride ions are present.

2. An improved process according to claim 1 wherein said bismuth vanadate pigment is a compound of the formula I $$Ti\ (Bi,A)(V,D)O_4 \qquad (I)$$ 

wherein A is an alkaline earth metal, Zn or a mixture thereof, D is Mo or W or a mixture thereof, and the molar ratio of A to Bi is between 0.01 and 0.6 and the molar ratio of D to V is between 0 and 0.4 and wherein a solution of a bismuth (III) salt containing an alkaline earth metal salt or a zinc salt or a mixture thereof is mixed with said solution of a vanadate salt in the ratios set forth hereinabove.

3. A process according to claim 2, wherein in formula I the molar ratio of A to Bi is between 0.02 and 0.5 and that of D to V between 0.01 and 0.3.

4. A process according to claim 2, wherein in formula I A is Ca or Sr and D is Mo or W, and the molar ratio of A to Bi is between 0.03 and 0.4 and that of D to V between 0.01 and 0.3.

5. A process according to claim 2, wherein in formula I A is Ca and D is Mo, and the molar ratio of Ca to Bi is between 0.03 and 0.4 and that of Mo to V between 0.01 and 0.3.

6. A process according to claim 1, wherein the fluoride ions are present in the vanadate solution.

7. A process according go claim 1, wherein the fluoride ions are admixed not until the aftertreatment is carried out.

8. A process according to claim 1, wherein between 0.1 and 3 mol of a fluoride salt, relative to 1 mol of bismuth, are used.

9. A process according to claim 7, wherein one 1 mol of a fluoride salt, relative to 1 mol of bismuth, is used.

10. A bismuth vanadate pigment obtained according to the process of claim 1 of the formula I $$(Bi,A)(V,D)O_4 \qquad (I)$$ 

wherein A is an alkaline earth metal, Zn or a mixture thereof and D is Mo, W or a mixture thereof and the molar ratio of A to Bi is between 0.01 and 0.6 and the molar ratio of D to V is between 0 and 0.4, wherein these compounds have a color strength of 0.045 to 0.130 at a standard depth of shade of 1/25 according to DN 53235.

11. A bismuth vanadate pigment of the formula I according to claim 10, wherein the molar ratio of A to Bi is between 0.02 and 0.5 and that of D to V between 0.01 and 0.3.

12. A bismuth vanadate pigment of the formula I according to claim 10, A is Ca and D is Mo and the molar ratio of Ca to Bi is between 0.03 and 0.4 and that of Mo to V between 0.01 and 0.3.

13. A process according to claim 1, wherein the compounds obtained are coated with an inorganic or organic protective cover.

14. A method for the coloration of high-molecular-weight organic material comprising admixing therewith a bismuth vanadate pigment obtained according to the process of claim 1.

15. A high-molecular-weight organic material containing a pigment obtained according to claim 1.

* * * * *